United States Patent [19]

Brenneisen et al.

[11] Patent Number: 4,820,808

[45] Date of Patent: Apr. 11, 1989

[54] COPPER COMPLEXES OF DISAZO COMPOUNDS HAVING TWO SUBSTITUTED 2-HYDROXYPHENYL DIAZO COMPONENT RADICALS AND TWO 3-METHYLPYRAZOL-5-ONE COUPLING COMPONENT RADICALS

[75] Inventors: Kurt Brenneisen, Grenzach; Friedrich Lehr, Efringen Kirchen, both of Fed. Rep. of Germany

[73] Assignee: Sandoz Ltd., Basel, Switzerland

[21] Appl. No.: 927,555

[22] Filed: Nov. 5, 1986

[30] Foreign Application Priority Data

Nov. 7, 1985 [DE] Fed. Rep. of Germany ....... 3539462

[51] Int. Cl.$^4$ .................. C09B 45/28; C09B 62/095; D06P 1/38; D06P 1/382
[52] U.S. Cl. .................................. 534/624; 534/602; 534/625; 534/709; 534/712; 534/784
[58] Field of Search ................. 534/624, 625, 709; 8/662

[56] References Cited

U.S. PATENT DOCUMENTS

| | | | |
|---|---|---|---|
| 2,185,901 | 1/1940 | Schmid | 534/709 |
| 2,221,361 | 11/1940 | Schmid, II | 260/147 |
| 2,505,244 | 4/1950 | Hindermann | 534/709 X |
| 2,646,338 | 7/1953 | Kappeler et al. | 8/26 |
| 2,813,852 | 11/1957 | Grandjean et al. | 534/709 X |
| 2,829,141 | 4/1958 | Bossard et al. | 534/709 X |
| 3,646,002 | 2/1972 | Andrew et al. | 260/146 |
| 4,378,312 | 3/1983 | Hoyer et al. | 260/146 |

FOREIGN PATENT DOCUMENTS

| | | | |
|---|---|---|---|
| 1074174 | 1/1960 | Fed. Rep. of Germany | 534/709 |
| 757927 | 9/1956 | United Kingdom | 534/709 |
| 2122634 | 1/1984 | United Kingdom | 534/627 |
| 2134914 | 8/1984 | United Kingdom | 534/627 |

*Primary Examiner*—Floyd D. Higel
*Attorney, Agent, or Firm*—Gerald D. Sharkin; Richard E. Vila; Melvyn M. Kassenoff

[57] ABSTRACT

Complexes of the formula

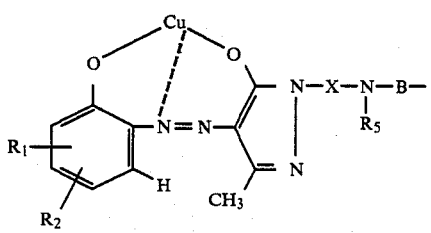

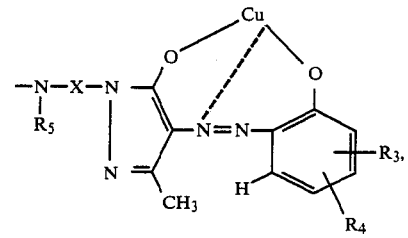

and salts thereof each cation of which is independently a non-chromophoric cation, wherein B is —CO—CH=CH—CO—, —CO—(CH$_2$)$_a$—CO—,

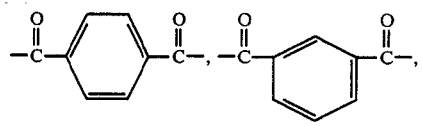

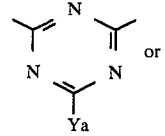

or

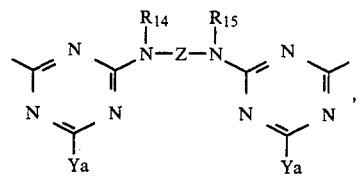

and each of $R_1$, $R_2$, $R_3$ and $R_4$ is independently hydrogen, halo, nitro, $C_{1-4}$alkyl, $C_{1-4}$alkyoxy, —NHCO—$R_6$, —CO—$R_7$ or —SO$_2$—$R_8$, wherein $R_6$ is $C_{1-4}$alkyl or phenyl, $R_7$ is hydroxy; —OR$_9$; $C_{1-4}$alkyl; phenyl; phenyl substituted by 1 or 2 substituents selected from halo, nitro, $C_{1-4}$alkyl and $C_{1-4}$alkoxy; cyclohexyl; cyclohexyl substituted by 1 to 3 $C_{1-4}$alkyl groups; or —NR$_{10}$R$_{11}$, and, $R_8$ is hydroxy; $C_{1-4}$alkyl; $C_{1-4}$alkyl monosubstituted by halo or sulfato; $C_{2-4}$alkenyl; phenyl; phenyl substituted by 1 or 2 substituents selected from halo, nitro, $C_{1-4}$alkyl and $C_{1-4}$alkoxy; cyclohexyl; cyclohexyl substituted by 1 to 3 $C_{1-4}$alkyl groups; or —NR$_{10}$R$_{11}$, with the proviso that at least one of $R_1$, $R_2$, $R_3$ and $R_4$ is —SO$_2$—$R_8$, each $R_5$ is independently hydrogen, $C_{1-4}$alkyl or $C_{1-4}$alkyl monosubstituted by hydroxy, halo or cyano, and each X is independently (Abstract continued on next page.)

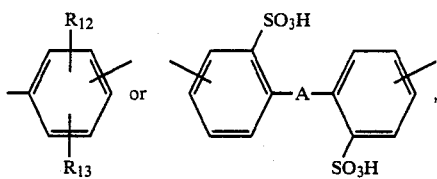

wherein A is —CH=CH— or —CH$_2$CH$_2$—,
  R$_{12}$ is hydrogen or sulfo, and
  R$_{13}$ is hydrogen, halo, C$_{1-4}$alkyl or C$_{1-4}$alkoxy,
and mixtures of such complexes each of which is in free acid form or salt form each cation of which is independently a non-chromophoric cation, are useful for dyeing or printing hydroxy group- or nitrogen-containing organic substrates, preferably textile material consisting of or containing cellulose fibers, especially cotton, alone or blended with other suitable textile fibers. The resulting dyed or printed textile material may be aftertreated with a polymeric polybasic amino compound in order to improve the wet fastness properties.

19 Claims, No Drawings

COPPER COMPLEXES OF DISAZO COMPOUNDS HAVING TWO SUBSTITUTED 2-HYDROXYPHENYL DIAZO COMPONENT RADICALS AND TWO 3-METHYLPYRAZOL-5-ONE COUPLING COMPONENT RADICALS

This invention relates to metallised disazo compounds, processes for their preparation and processes for dyeing or printing hydroxy group- or nitrogen-containing organic substrates using these compounds in conventional manner and to special aftertreatment of the resulting dyeings and prints.

According to the invention there is provided a metallised disazo compounds of formula I,

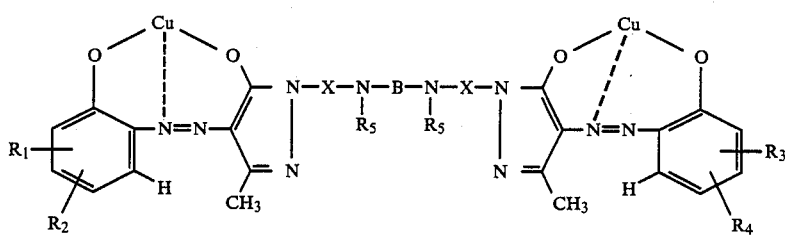

in free acid or salt form,
in which
each of $R_1$ and $R_2$ is independently hydrogen, halogen, nitro, $C_{1-4}$alkyl, $C_{1-4}$alkoxy, —NHCOR$_6$, —COR$_7$ or —SO$_2$R$_8$, each $R_6$ is independently $C_{1-4}$alkyl or phenyl, each $R_7$ is independently OH; —OR$_9$; $C_{1-4}$alkyl; phenyl; phenyl substituted by 1 or 2 groups selected from halogen, nitro, $C_{1-4}$alkyl and $C_{1-4}$alkoxy; cyclohexyl; cyclohexyl substituted by 1 to 3 $C_{1-4}$alkyl groups; or —NR$_{10}$R$_{11}$, $R_9$ is $C_{1-4}$alkyl, phenyl or phenyl-$C_{1-4}$alkyl, wherein the phenyl ring of the latter two groups is unsubstituted or substituted by 1 or 2 groups selected from halogen, nitro, $C_{1-4}$alkyl and $C_{1-4}$alkoxy, each $R_8$ is independently OH; $C_{1-4}$alkyl; $C_{1-4}$alkyl monosubstituted by halogen or —OSO$_3$H; $C_{2-4}$alkenyl; phenyl which is unsubstituted or substituted by 1 or 2 groups selected from halogen, nitro, $C_{1-4}$alkyl and $C_{1-4}$alkoxy; cyclohexyl; cyclohexyl substituted by 1 to 3 $C_{1-4}$alkyl groups; or —NR$_{10}$R$_{11}$, $R_{10}$ is hydrogen; $C_{1-4}$alkyl; $C_{1-4}$alkyl substituted by 1 or 2 groups selected from OH, $C_{1-4}$alkoxy, halogen and cyano; phenyl; phenyl substituted by 1 or 2 groups selected from halogen, nitro, $C_{1-4}$alkyl and $C_{1-4}$alkoxy; cyclohexyl; or cyclohexyl substituted by 1 to 3 $C_{1-4}$alkyl groups, $R_{11}$ is hydrogen; $C_{1-4}$alkyl; $C_{1-4}$alkyl substituted by 1 or 2 groups selected from OH, $C_{1-4}$alkoxy, halogen and cyano; cyclohexyl; or cyclohexyl substituted by 1 to 3 $C_{1-4}$alkyl groups; or $R_{10}$ and $R_{11}$, together with the nitrogen atom to which they are attached, form a saturated 5- or 6-membered hetero ring which may contain one further hetero atom selected from N, O and S, each of $R_3$ and $R_4$ has independently one of the significances of $R_1$ and $R_2$, provided that at least one of $R_1$ to $R_4$ is —SO$_2$R$_8$, each $R_5$ is independently hydrogen, $C_{1-4}$alkyl, or $C_{1-4}$alkyl monosubstituted by OH, halogen or cyano, each X is independently a group of formula (a) or (b),

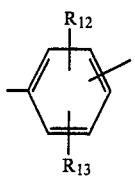

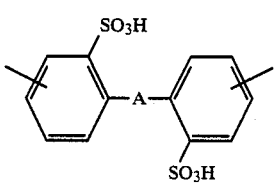

in which
$R_{12}$ is hydrogen or sulpho,
$R_{13}$ is hydrogen, halogen, $C_{1-4}$alkyl or $C_{1-4}$alkoxy, and
A is —C=CH— or —CH$_2$CH$_2$—,

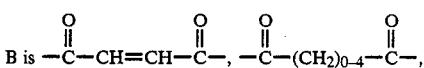

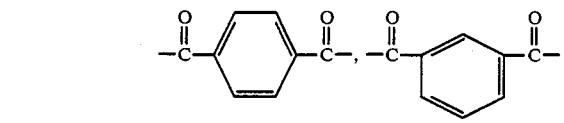

or is a group of formula (c) or (d),

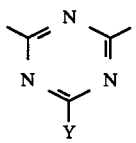

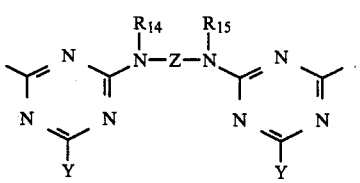

in which
each of $R_{14}$ and $R_{15}$ is independently hydrogen or $C_{1-4}$alkyl, Z is $C_{2-6}$alkylene, monohydroxy-substituted $C_{3-6}$alkylene, $C_{5-6}$cycloalkylene, $C_{5-6}$cycloalkylene substituted by 1 to 3 $C_{1-4}$alkyl groups, phenylene which is unsubstituted or substituted by 1 or 2 groups selected from halogen, $C_{1-4}$alkyl, $C_{1-4}$alkoxy, sulpho and carboxy, or a group of formula (b) or (e),

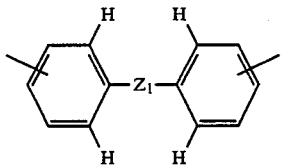 (e)

or

Z, together with

and

to which it is attached, forms a piperazine ring, $Z_1$ is —NHCONH— or —NHCO—, and each Y is independently halogen, OH, $NH_2$, —NHOH, $C_{1-4}$alkoxy, phenoxy, an aliphatic, cycloaliphatic or aromatic amino group or a saturated 5- or 6-membered heterocyclic amino group in which the nitrogen atom is part of the heterocyclic ring which may contain 1 or 2 further hetero atoms selected from N, O and S, or a mixture of compounds of formula I, which compounds are in free acid or salt form.

Preferably, in a compound of formula I each of the terminal phenyl groups contains at least one group —$SO_2R_8$, in which $R_8$ more preferably is hydroxy, and the bridge member

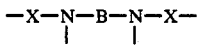

is then preferably free of sulpho groups.

In the specification, any alkyl or alkylene group present is linear or branched unless indicated otherwise. In any hydroxy- or alkoxy-substituted alkyl or alkylene group which is attached to a nitrogen atom, the hydroxy- or alkoxy-group is preferably bound to a carbon atom other than to the $C_1$-atom.

Any halogen as an alkyl substituent is preferably fluorine, chlorine or bromine, more preferably chlorine or bromine. Any halogen as a phenyl substituent is preferably chlorine or bromine, especially chlorine.

Any halogen as Y is preferably fluorine, chlorine or bromine, especially chlorine.

Any alkyl as $R_1$ to $R_4$ is preferably methyl or ethyl, more preferably methyl; any alkoxy is preferably methoxy or ethoxy, more preferably methoxy.

Any alkyl as $R_6$ is preferably methyl or ethyl, more preferably methyl.

$R_6$ is preferably $R_{6a}$, where $R_{6a}$ is methyl, ethyl or phenyl. More preferably, it is $R_{6b}$, where $R_{6b}$ is methyl or phenyl. Most preferably, $R_6$ is methyl.

Any alkyl as $R_9$ is preferably methyl or ethyl. Any phenylalkyl group as $R_9$ preferably contains a $C_1$-$C_2$alkyl group. In any substituted phenyl or phenylalkyl group the phenyl ring is preferably monosubstituted by chlorine, nitro, methyl or methoxy.

$R_9$ is preferably $R_{9a}$, where $R_{9a}$ is methyl, ethyl, phenyl or phenyl-$C_{1-2}$alkyl, wherein the phenyl ring of the latter two groups is unsubstituted or monosubstituted by chlorine, nitro, methyl or methoxy. More preferably, it is $R_{9b}$, where $R_{9b}$ is methyl, ethyl, phenyl or benzyl. Most preferably, it is $R_{9c}$, where $R_{9c}$ is methyl or ethyl.

Any alkyl as $R_7$ or $R_8$ is preferably methyl or ethyl. Any substituted phenyl is preferably monosubstituted by chlorine, methyl or methoxy. Any substituted cyclohexyl is preferably substituted by 1 to 3 methyl groups.

Any alkenyl as $R_8$ is preferably a vinyl group.

Any alkyl as $R_{10}$ or $R_{11}$ is preferably methyl or ethyl. Any substituted alkyl is preferably $C_{2-3}$alkyl, which is preferably monosubstituted by hydroxy, methoxy, chlorine or cyano; more preferably, it is monosubstituted by hydroxy.

Any substituted phenyl as $R_{10}$ is preferably substituted by 1 or 2 groups selected from chlorine, nitro, methyl and methoxy; more preferably, it is monosubstituted by chlorine or methyl.

Any alkyl substituted cyclohexyl as $R_{10}$ or $R_{11}$ is preferably substituted by up to three methyl groups.

$R_{10}$ and $R_{11}$, together with the nitrogen atom to which they are attached, preferably form a morpholine, piperidine, piperazine or pyrrolidine ring, which is preferably unsubstituted; more preferably, they form an unsubstituted morpholine or piperazine ring, especially a piperazine ring.

$R_{10}$ is preferably $R_{10a}$, where $R_{10a}$ is hydrogen, methyl, ethyl, $C_{2-3}$alkyl monosubstituted by hydroxy, methoxy, chlorine or cyano, phenyl, phenyl substituted by 1 or 2 groups selected from chlorine, nitro, methyl and methoxy, cyclohexyl or cyclohexyl substituted by 1 to 3 methyl groups, or together with $R_{11}$ and the nitrogen atom to which $R_{10a}$ and $R_{11}$ are attached, forms a piperidine, piperazine or morpholine ring. More preferably, it is $R_{10b}$, where $R_{10b}$ is hydrogen, methyl, ethyl, monohydroxy-substituted $C_{2-3}$alkyl, phenyl, phenyl monosubstituted by chlorine or methyl, or cyclohexyl, or together with $R_{11}$ and the nitrogen atom to which $R_{10b}$ and $R_{11}$ are attached, forms a piperazine ring. Even more preferably, it is $R_{10c}$, where $R_{10c}$ is hydrogen, methyl, ethyl, monohydroxy substituted $C_{2-3}$alkyl or cyclohexyl. Most preferably, $R_{10}$ is hydrogen.

$R_{11}$ is preferably $R_{11a}$, where $R_{11a}$ is hydrogen, methyl, ethyl, $C_{2-3}$alkyl monosubstituted by hydroxy, methyl, chlorine or cyano, or cyclohexyl, or together with $R_{10}$ and the nitrogen atom to which $R_{10}$ and $R_{11a}$ are attached, forms a piperidine, piperazine or morpholine ring. More preferably, it is $R_{11b}$, where $R_{11b}$ is hydrogen, methyl, ethyl, monohydroxy-substituted $C_{2-3}$alkyl, or cyclohexyl, or together with $R_{10}$ and the nitrogen atom to which $R_{10}$ and $R_{11b}$ are attached, forms a piperazine ring. Most preferably, $R_{11}$ is hydrogen.

$R_7$ is preferably $R_{7a}$, where $R_{7a}$ is OH, —$OR_{9a}$, methyl, ethyl, phenyl, phenyl monosubstituted by chlorine, methyl or methoxy, or —$NR_{10b}R_{11b}$. More preferably, it is $R_{7b}$, where $R_{7b}$ is OH, —$OR_{9b}$, methyl, ethyl, phenyl or —$NHR_{10c}$. Even more preferably, it is $R_{7c}$, where $R_{7c}$ is OH, —$OR_{9c}$ or $NH_2$. Most preferably, $R_7$ is OH.

$R_8$ is preferably $R_{8a}$, where $R_{8a}$ is OH, methyl, ethyl, phenyl, monosubstituted by chlorine, methyl or methoxy, —$NR_{10a}R_{11a}$, —$CH_2CH_2OSO_3H$ or —CH=CH$_2$. More preferably, it is R$_{8b}$, where R$_{8b}$ is OH, methyl, ethyl, phenyl, phenyl monosubstituted by chlorine, methyl or methoxy, or —NR$_{10a}$R$_{11a}$. Even more preferably, it is R$_{8c}$, where R$_{8c}$ is OH, methyl, ethyl, phenyl or —NR$_{10b}$R$_{11b}$. Even more preferably, it is R$_{8d}$, where R$_{8d}$ is OH, methyl or —NHR$_{10c}$. Most preferably, it is R$_{8e}$, where R$_{8e}$ is OH or NH$_2$, especially OH.

Each of R$_1$, R$_2$, R$_3$ and R$_4$ is preferably R$_{1a}$, R$_{2a}$, R$_{3a}$ and R$_{4a}$, where each of R$_{1a}$ to R$_{4a}$ is independently hydrogen, chlorine, nitro, methyl, ethyl, methoxy, ethoxy, —NHCOR$_{6a}$, —COR$_{7a}$ or —SO$_2$R$_{8b}$. More preferably, each of them is R$_{1b}$, R$_{2b}$, R$_{3b}$ and R$_{4b}$, where each of R$_{1b}$ to R$_{4b}$ is independently hydrogen, chlorine, nitro, methyl, methoxy, —NHCOR$_{6b}$, —COR$_{7b}$ or —SO$_2$R$_{8c}$. More preferably, each of R$_1$ and R$_3$ is R$_{1c}$ and R$_{3c}$, where each of R$_{1c}$ and R$_{3c}$ is independently —SO$_2$R$_{8d}$, and each of R$_2$ and R$_4$ is R$_{2c}$ and R$_{4c}$, where each of R$_{2c}$ and R$_{4c}$ is independently hydrogen, chlorine, nitro, methyl, SO$_3$H, —NHCOCH$_3$ or —COR$_{7c}$. Even more preferably, each of R$_1$ and R$_3$ is R$_{1d}$ and R$_{3d}$, where each of R$_{1d}$ and R$_{3d}$ is independently —SO$_2$R$_{8e}$, and each of R$_2$ and R$_4$ is R$_{2d}$ and R$_{4d}$, where each R$_{2d}$ and R$_{4d}$ is independently hydrogen, chlorine, methyl or SO$_3$H. Most preferably, each of R$_1$ and R$_3$ is SO$_3$H; and each of R$_2$ and R$_4$ is independently hydrogen, chlorine or SO$_3$H.

Any alkyl as R$_5$ is preferably methyl or ethyl; any substituted alkyl is preferably monohydroxy-substituted C$_{2-3}$alkyl.

Each R$_5$ is preferably R$_{5a}$, where each R$_{5a}$ is independently hydrogen, methyl, ethyl or monohydroxy-substituted C$_{2-3}$alkyl. Most preferably, R$_5$ is hydrogen.

Any alkyl or alkoxy as R$_{13}$ preferably contains 1 or 2 carbon atoms, more preferably it is methyl or methoxy.

R$_{13}$ is preferably R$_{13a}$, where R$_{13a}$ is hydrogen, chlorine, methyl or methoxy. Most preferably, R$_{12}$ and R$_{13}$ are both hydrogen.

Each X is preferably Xa, where each Xa is independently a group

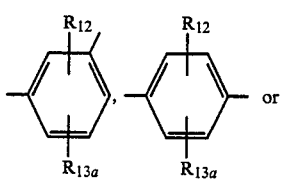

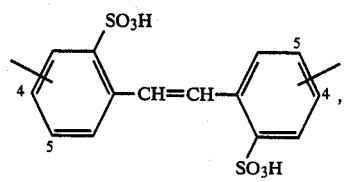

in which latter group the phenylene groups are independently bound in the 4- or 5-positions. More preferably, each X is Xb, where each Xb is independently 1,3-phenylene, 1,4-phenylene or

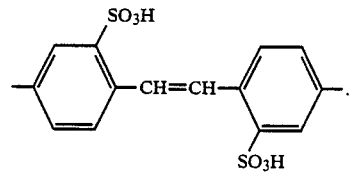

Even more preferably, both groups X are identical. Most preferably, X is Xc, where Xc is 1,4-phenylene.

Each of R$_{14}$ and R$_{15}$ is preferably R$_{14a}$ and R$_{15a}$, where each of R$_{14a}$ and R$_{15a}$ is independently hydrogen, methyl or ethyl; most preferably R$_{14}$ and R$_{15}$ are hydrogen.

Any unsubstituted alkylene as Z preferably contains 2 or 3 carbon atoms and is most preferably ethylene. Any substituted alkylene preferably contains 3 or 4 carbon atoms; most preferably it is 2-hydroxypropylene-1,3.

Any cycloalkylene as Z is preferably cyclohexylene which is unsubstituted or substituted by up to three methyl groups.

Any phenylene as Z is preferably 1,3- or 1,4-phenylene which is unsubstituted or monosubstituted by chlorine, methyl, methoxy, sulpho or carboxy.

Z is preferably Za, where Za is C$_{2-3}$alkylene, monohydroxy-substituted C$_{3-4}$alkylene, 1,4-cyclohexylene, 1,3- or 1,4-phenylene which is unsubstituted or monosubstituted by chlorine, methyl, methoxy, sulpho or carboxy, or a group of formula (b) or (e), or together with

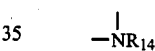

and

to which it is attached, forms a piperazine ring. More preferably, Z is Zb, where Zb is 1,3- or 1,4-phenylene or a group of formula (b), or together with

and

to which is it attached, forms a piperazine ring. Most preferably, Z is 1,4-phenylene.

Any alkoxy as Y is preferably methoxy.

When Y is an aliphatic amino group it is preferably a monoalkyl- or dialkyl-amino group in which each alkyl group contains 1 to 4 carbon atoms and it is unsubstituted or monosubstituted by halogen, NH$_2$, carboxy, sulpho or methoxy, or is substituted by one or two hydroxy groups.

Any cycloaliphatic amino group as Y is preferably a C$_{5-6}$cycloalkylamino group, especially a cyclohexylamino group.

Any aromatic amino group is preferably phenylamino in which the phenyl ring is unsubstituted or substituted by 1 or 2 groups selected from halogen, $C_{1-4}$alkyl, $C_{1-4}$alkoxy, —NHCO$C_{1-4}$alkyl, sulpho, carboxy and —SO$_2$CH$_2$CH$_2$OSO$_3$H.

Any heterocyclic amino group as Y is preferably morpholino, piperidino, piperazino or pyrrolidino, which are preferably unsubstituted.

Each Y is preferably Ya, where each Ya is independently chlorine; OH; NH$_2$; methoxy; mono-$C_{1-4}$alkylamino; di-$C_{1-4}$alkylamino; monohydroxy-$C_{2-4}$alkylamino, monomethoxy-$C_{2-4}$alkylamino, monoamino-$C_{2-4}$alkylamino; monosulpho-$C_{1-4}$alkylamino; dihydroxy-$C_{3-4}$alkylamino; bis(monohydroxy-$C_{2-4}$alkyl)amino; phenylamino in which the phenyl ring is unsubstituted or substituted by 1 or 2 groups selected from chlorine, methyl, methoxy, acetamido, sulpho, carboxy and —SO$_2$CH$_2$CH$_2$OSO$_3$H; piperidino or morpholino. More preferably, each Y is Yb, where each Yb is independently chloride; NH$_2$; mono-$C_{1-2}$alkylamino; monohydroxy-$C_{2-3}$alkylamino; monomethyl-$C_{2-3}$alkylamino; bis(monohydroxy-$C_{2-3}$alkyl)amino; phenylamino in which the phenyl ring is unsubstituted or monosubstituted by acetamido or sulpho; piperidino or morpholino. Even more preferably, each Y is Yc, where each Yc is independently chlorine, 2-hydroxyethylamino, bis(2-hydroxyethyl)amino, 3-methoxypropylamino, phenylamino or morpholino. Most preferably each Y is Yd, where each Yd is independently chlorine, 2-hydroxyethylamino, bis(2-hydroxyethyl)amino, 3-methoxypropylamino or morpholino.

A group (c) is preferably (c$_1$), where (c$_1$) is a group (c) in which Y is Ya. More preferably, it is (c$_2$), where (c$_2$) is a group (c) in which Y is Yb. Even more preferably, it is (c$_3$), where (c$_3$) is a group (c) in which Y is Yc. Most preferably (c) is (c$_4$), where (c$_4$) is a group (c) in which Y is Yd.

A group (d) is preferably (d$_1$) of formula

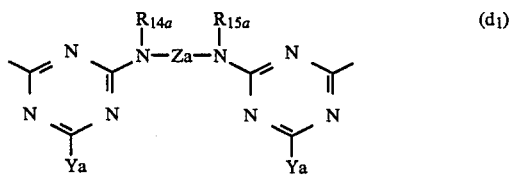

more preferably it is (d$_2$) of formula

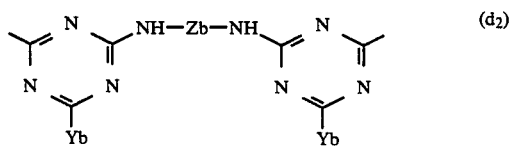

even more preferably it is (d$_3$) of formula

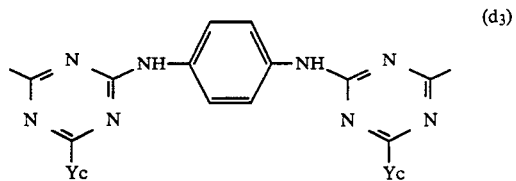

In (d$_1$) to (d$_3$) both groups Ya, Yb and Yc, respectively, may be the same or different; more preferably they are identical. Most preferably, (d) is a group (d$_4$), where (d$_4$) is a group (d) in which each Y is Yd and both groups Yd are identical.

B is preferably Ba, where Ba is

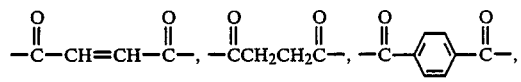

or a group (c$_1$) or (d$_1$); more preferably, it is Bb, where Bb is a group (c$_2$) or (d$_2$); even more preferably, it is Bc, where Bc is a group (c$_3$) or (d$_3$); still more preferably, it is Bd, where Bd is a group (c$_4$) or (d$_3$); most preferably, B is Be, where Be is a group (d$_4$).

Preferred compounds correspond to formula Ia,

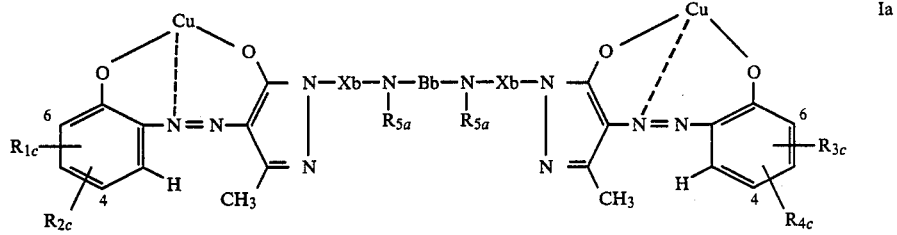

in free acid or salt form, in which each of R$_{1c}$ and R$_{3c}$, each of R$_{2c}$ and R$_{4c}$, each R$_{5a}$, and each Xb, respectively, are defined independently and are preferably identical.

More preferred are compounds of formula Ia, in which (1) each R$_{5a}$ is hydrogen;

(2) each of R$_{1c}$ and R$_{3c}$ is independently R$_{1d}$ and R$_{3d}$, and each of R$_{2c}$ and R$_{4c}$ is independently R$_{2d}$ and R$_{4d}$, where R$_{1d}$ and R$_{2d}$ as well as R$_{3d}$ and R$_{4d}$ are in the 4,6-positions;

(3) those of (2) in which each of R$_{1d}$ and R$_{3d}$ is sulpho, and each of R$_{2d}$ and R$_{4d}$ is independently hydrogen, chlorine or sulpho;

(4) Bb is Bc;

(5) those of (1) to (4) in which Bb is Bd;

(6) those of (5) in which Bb is Be;

(7) those of (1) to (6) in which Xb is Xc.

When a compound of formula I or Ia is in salt form, the cation associated with the sulpho and/or carboxy groups is not critical and may be any of those non-chromophoric cations conventional in the field of anionic direct dyes. Generally, in a compound of formula I or Ia the cations of the sulpho and/or carboxy groups may be the same or different, e.g. the compound may be in a mixed salt form; preferably, the cations are the same.

Examples of such cations are alkali metal cations and unsubstituted and substituted ammonium cations, e.g. lithium, sodium, potassium, ammonium, mono-, di-, triand tetra-methylammonium, triethylammonium and mono-, di- and tri-ethanolammonium.

The preferred cations are the alkali metal cations and ammonium, with sodium being the most preferred.

The present invention further provides a process for the preparation of compounds of formula I comprising reacting the following components:

diazotised amino compounds of formulae IIa and IIb,

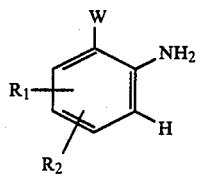
IIa

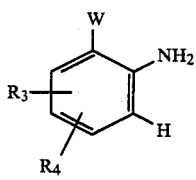
IIb in which $R_1$ to $R_4$ are as defined above and each W is independently hydrogen, hydroxy or methoxy, coupling components of formula III,

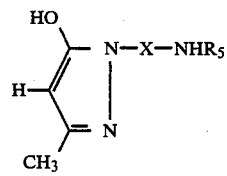
III in which X and $R_5$ are as defined above;

a triazine halogenide or a compound of formula IV,

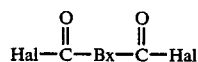
IV in which Hal is halogen, and Bx is —CH=CH—, —(CH$_2$)$_{0-4}$—,

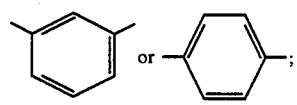

optionally an inorganic base or a compound of formula H-Yx, in which Yx has one of the significances of Y as defined above with the exception of halogen and hydroxy; and/or a corresponding diamine or diamine/acid dichloride to introduce the bridge member

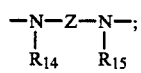

a copper-donating compound to obtain a 1:1 copper complex;

which components must be present in the corresponding stoichiometric molar ratios to obtain a compound of formula I—by coupling and condensing in any desired order and coppering the resulting monoazo compounds before or after the condensation reactions.

In the case where different compounds of formulae IIa and IIb and/or different compounds of formula III are employed and the coupling reactions are carried out other than by two separate processes, namely by a one step mixed coupling, a mixture of compounds of formula I is obtained consisting of those compounds having two different chromophores and those having identical chromophores.

The 1:1 metallisation is carried out in accordance with known methods. Suitably, the corresponding hydroxy group-containing compounds (W=OH) are used as starting materials, and coppering is preferably effected at a temperature range of 20°-50° C. in a weakly acid reaction medium using the conventional copper(II) salts. Likewise, oxidative coppering (W=H), preferably at 40°-70° C. and at pH 4-7 in the presence of copper(II) salts or using copper powder in the presence of hydrogen peroxide or other conventional oxidising agents; or demethylation coppering (W=OCH$_3$), preferably at pH 4-6 and at elevated to boiling temperature in the presence of copper (II) salts, is carried out.

Diazotisation and coupling reactions may be effected in conventional manner. The replacement of the halogen atoms in a triazine halogenide by separate condensation steps may be effected in conventional manner. Likewise, the condensation with a compound of formula IV may be carried out in conventional manner.

The compounds of formula I may be isolated in accordance with known methods, for example by conventional salting out, for example with an alkali metal salt, filtering and drying in vacuo.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting materials, compounds of formulae IIa, IIb, III and IV, are either known or may be prepared in accordance with known methods from available starting materials.

The compounds of formula I and mixtures thereof which are preferably in salt form are useful for dyeing or printing hydroxy group- or nitrogen-containing organic substrates. Preferred substrates are paper, leather and textiles containing or consisting of cellulose fibres, such as cotton. Most preferred is cotton or regenerated cellulose, particularly cotton, which also may be blended together or individually with other suitable textile fibres.

The compounds according to the invention show high affinity for the substrate and therefore are good direct dyes. Dyeing and printing may be carried out in accordance with known methods. Dyeing of natural or regenerated cellulose such as cotton is preferably carried out according to the conventional exhaust dyeing method using temperatures from 50° to 100° C. Continuous dyeing methods are also suitable and thus processes such as cold pad-batch, pad-steam, pad-roll or pad-dry may be applied.

The compounds of formula I have high colouring strength and give high exhaust and fixation yields. They are well compatible with other dyes and may be applied per se or in combination with appropriate dyes of the same class showing similar dyeing properties. The dyeings obtained with such combination mixtures have good fastness properties.

Generally, the dyeings and prints obtained on the above mentioned substrates exhibit good wet fastness properties (such as fastness to water, washing or sweat) and good light fastness. Furthermore, they are stable to any oxidative influences, e.g., chlorinated water, hypochlorite bleach, peroxide or perborate containing wash liquors.

The wet fastness properties of the dyeings or prints on hydroxy group- or nitrogen-containing textile fibres, and preferably on textile material consisting of or containing cellulose fibres, particularly cotton, made with the compounds of formula I may be further improved by a special aftertreatment with a polymeric polybasic amino compound (A) which is suitably carried out at a pH of from 7 to 14. Particularly, this aftertreatment gives improved wash fastness properties allowing repeated washing at 60° C.

As a polymeric polybasic amino compound (A) preferably a compound (A1) is used which is the reaction product of an amine of formula V $$R-NH-R \qquad V$$

or, more preferably, of a polyalkylene polyamine of formula VI $$RRN-(Z_1-X_o)_p-Z_1-NRR \qquad VI$$

in which each R is independently hydrogen, unsubstituted $C_{1-10}$alkyl or $C_{1-10}$alkyl monosubstituted by hydroxy, $C_{1-4}$alkoxy or cyano, p is a number from 0 to 100, $Z_1$, or each $Z_1$ when p>0, is independently $C_{2-4}$alkylene or $C_{2-4}$hydroxyalkylene, and $X_o$, or each $X_o$ when p>1, is independently —O—, —S— or —NR— where R is as defined above, provided that the amine of formula VI contains at least one reactive

or —NH$_2$ group, with cyanamide, dicyandiamide (DCDA), guanidine or biguanide.

Most preferred as compound of formula VI are diethylene triamine, triethylene tetramine, tetraethylene pentamine, 2-aminoethyl-3-aminopropylamine, dipropylene triamine and N,N—bis—(3-aminopropyl)methylamine.

The compounds (A1) are known; they may be prepared, for example, according to the method described in British Pat. No. 657,753, U.S. Pat. No. 2,649,354 or U.S. Pat. No. 4,410,652.

Most preferred as compounds (A1) are the reaction products of DCDA with diethylene triamine or triethylene tetramine.

Preferred compounds (A) are compounds (A2) which are reaction products of compounds (A1) with epihalohydrin or a precursor thereof, especially epichlorohydrin.

Such products are described in U.S. Pat. No. 4,439,203, the disclosure of which is incorporated herein by reference.

A further group of preferred compounds (A) are the compounds (A3) which are the reaction products of compounds (A1) with an organic compound (B) containing at least two groups capable of being split off as anions on reaction with (A1).

Preferred compounds (B) correspond to formula VII, VIII or IX, $$HN(CH_2CH_2Cl)_2 \qquad VII$$

$$BrCH_2CH_2Br \qquad VIII$$

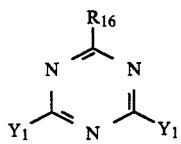

in which both $Y_1$'s are identical and are chlorine or bromine, and $R_{16}$ is Cl or —NHCH$_2$CH$_2$CH$_2$N$\oplus$(CH$_3$)$_3$An$\ominus$ where An$\ominus$ is Cl$\ominus$ or CH$_3$SO$_4$$\ominus$.

A further group of preferred compounds (A) are the compounds (A4) which are obtained by reacting epihalohydrin or a precursor thereof with a polyalkylene polyamine (C). Preferred compounds (A4) are the reaction products of 1.5–2.5 moles of epichlorohydrin with 1 mole of a polyalkylene polyamine (C) corresponding to formula XV,

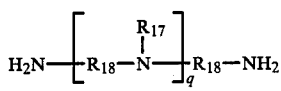

in which q is a number from 1 to 5, each $R_{18}$ is independently $C_{2-4}$alkylene, and each $R_{17}$ is independently phenyl, $C_{1-4}$alkyl or $C_{1-4}$alkyl monosubstitued by hydroxy, $C_{1-4}$alkoxy, halogen or phenyl.

The aftertreatment of the dyed or printed substrates with compound (A) is preferably carried out at a pH from 8 to 12, most preferably from 10 to 11. It may be a continuous process, for example padding, dipping, spraying or foam finishing, but is preferably a batchwise exhaust process. The aftertreatment is usually carried out at temperatures from 20°–190° C., preferably at 30°–70° C. for 3 to 60 minutes, preferably 5 to 20 minutes, preferably in the presence of 5 to 10 g/l of an electrolyte, e.g. sodium chloride or sodium sulphate. The quantity of compound (A) used will depend upon the depth of dyeing of the substrate, but in general from 0.1 to 6%, preferably 1 to 2%, based on the dry weight of substrate may be suitable. The pH of the aftertreatment bath may be adjusted by addition of alkali metal carbonate or hydroxide, preferably sodium or potassium carbonate or hydroxide. The liquor to goods ratio of the aftertreatment bath may be from 2:1 to 50:1, and the dyed or printed substrate may be dried before aftertreatment.

In a preferred aftertreatment process, the dyed or printed substrate is added at room temperature to a bath containing the required amount of compound (A) and 5 to 10 g/l of electrolyte, and adjusted with sodium carbonate to pH 10–11. Within 10 minutes the bath is raised to 60° C. and the substrate is treated at this temperature for 20 minutes. Finally, the aftertreated substrate is rinsed, optionally neutralised, and dried.

Dyeings and prints aftertreated according to the invention give better wet fastness properties than untreated dyeings.

The following examples in which parts and percentages are by weight or volume unless otherwise stated, and temperatures are in degrees Centigrade, illustrate the subject matter of the invention, Percentage figures for components of a dyebath or treatment bath are based on the dry weight of substrate.

EXAMPLE 1

53.8 Parts of 2-amino-1-hydroxybenzene-4,6-disulphonic acid (100%) are stirred in 80 parts of water, 120 parts of ice and 6.9 parts of 30% hydrochloric acid. Diazotisation is effected with 13.8 parts of sodium nitrite in 50 parts of water at a temperature not higher than 12°. After diazotisation is completed any excess nitrite is decomposed by adding a small amount of sulphamic acid.

To a mixture consisting of 37.8 parts of 1-(4'-aminophenyl)-3-methylpyrazol-5-one (100%) which were stirred with 300 parts of water, dissolved by the addition of 44 parts of a 30% sodium hydroxide solution and adjusted to pH 7.5, the above obtained diazo suspension is added dropwise during one hour at room temperature and at pH 7.3–7.5. The pH is kept in the range of 7.3–7.5 with the addition of a small amount of a 20% soda solution. Stirring is effected overnight to complete the coupling reaction.

Subsequently, the pH is adjusted to 6.5 with 30% hydrochloric acid, and the mixture is heated to 45°. 40 Parts of sodium acetate (crystalline) are then added. Within 30 minutes a solution of 50 parts of copper sulphate pentahydrate in 180 parts of water is added dropwise. The thus obtained complex dye precipitates at pH 4–5. The reaction mixture is adjusted to pH 5–6 by adding dilute sodium hydroxide solution and is filtered, and the precipitate is washed with a 20%, followed by a 10% sodium chloride solution.

The resulting wet press cake is dissolved in water at pH 7. Within 30 minutes at pH 5–6 this solution is pumped into a mixture consisting of 200 parts of ice, 100 parts of water and 36.9 parts of cyanuric chloride. The reaction temperature is elevated to room temperature and the pH is raised to 7.

At room temperature and at pH 7–8 10.8 parts of p-phenylene diamine are added to this mixture. It is heated to 40° and stirred overnight at pH 8 which is kept by adding 20% soda solution. Subsequently, the pH is adjusted to 4.5 and the temperature is raised to 85°. The resulting product is precipitated by the stepwise addition of sodium chloride. After stirring for a short time the precipitate is filtered off at ca. 80°, washed with a 10% sodium chloride solution and dried. The resulting dyestuff which, in the free acid form, has the formula

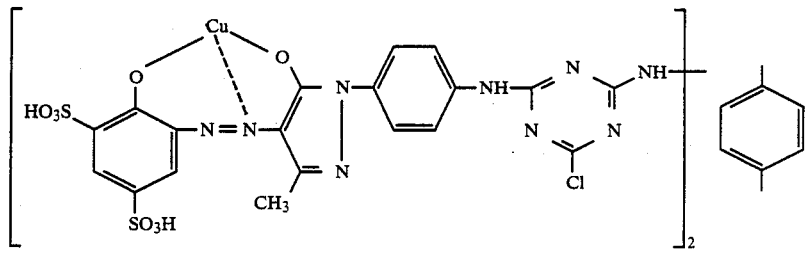

dyes cotton a brownish-yellow shade. These cotton dyeings show good light- and wet-fastness properties.

EXAMPLE 2

28 Parts of the dried dyestuff obtained according to the method given in Example 1 are stirred in 450 parts of water with the addition of 3.6 parts of morpholine. The resulting suspension is heated to 95°, and stirring is effected for one hour at this temperature. The reaction product is precipitated by the stepwise addition of sodium chloride. The thus obtained dyestuff is filtered and dried; it corresponds (in free acid form) to the formula

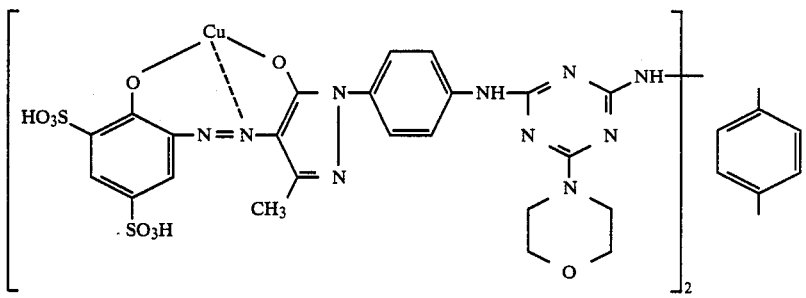

and dyes cotton, particularly according to the exhaust method, a yellow-brown shade. These dyeings hav notable good light- and wet-fastness properties.

APPLICATION EXAMPLES

In the following examples the application of the compounds of this invention and the aftertreatment of the resulting dyeings with a polymeric compound (A) is illustrated. Polymeric polybasic compounds (A) suitable as fixing agent are as follows:

(Aa1)

Product (A) of Example 1 of U.S. Pat. No. 4,410,652.

(Aa2)

The product of Example 1 of U.S. Pat. No. 4,439,203.

(Aa3)

The product of Example 1 of published British Patent Application No. 2,154,615A.

APPLICATION EXAMPLE I 0.5 Parts of the dye of Example 1 are dissolved in 200 parts of water at 60°. 10 Parts of cotton fabric, 16 parts of Glauber's salt and 4 parts of sodium carbonate are subsequently added to the dyebath. The temperature is raised to 98° over 45 minutes.

Dyeing is continued for 1 hour at 98°. During dyeing, the water that evaporates is continuously replaced. The dyed fabric is then removed from the liquor, rinsed with running cold and hot water, and washed at the boil for 15 minutes in 500 parts of demineralised water in the presence of 0.25 parts of a commercially available anion-active detergent. After rinsing and drying a brownish-yellow dyeing is obtained having good light- and wet-fastness properties.

APPLICATION EXAMPLE II 0.5 Parts of the dye of Example 1 or 2 are dissolved in 200 parts of demineralised water. The dyebath is heated to 50°–60°, then 10 parts of cotton cretonne fabric (bleached) are added. Within 30 minutes the temperature is elevated to 98°. At this temperature 1 part and after 10 minutes further 2 parts of Glauber's salt (calcined) are added, and the dyeing temperature is kept at 98° for 35 minutes. Finally, the dyebath is cooled to 80° within 15 minutes. Water that evaporates during the dyeing process is continuously replaced by demineralised water of 98°. The dyeing is rinsed with running cold water, centrifuged and dried at 80°. The resulting cotton dyeing in both cases is brownish-yellow.

APPLICATION EXAMPLE III

100 Parts of cotton woven fabric (bleached) are dyed in conventional manner, for example according to the method given in Application Example I or II, with 3 parts of the dye of Example 1 or 2. The dyed substrate is then aftertreated, without an intermediate drying step, for 20 minutes at 60° at a liquor to goods ratio of 20:1 in an aqueous bath containing 2 parts of the polymeric compound (Aa1) and 6 g/l sodium carbonate, giving a pH of 11.0. Finally the substrate is rinsed with cold water and dried.

The aftertreated brownish-yellow cotton dyeing has good wash fastness properties and is resistant to washing at the boil.

When in Application Example III product (Aa1) is replaced with corresponding amounts of products (Aa2) or (Aa3), similar good results are obtained. The aftertreated cotton dyeings, in view of their good wash fastness properties, resist repeated washing processes.

EXAMPLES 3 TO 60 (TABLE 1)

By analogy with the method described in Examples 1 and 2, using appropriate starting compounds (though the analogous process step concerning the condensation with p-phenylene diamine is omitted since the chromophores in all dyes of these examples are connected by a single triazine bridge), further compounds of formula I can be prepared which are listed in the following Table 1. They correspond (in free acid form) to formula X

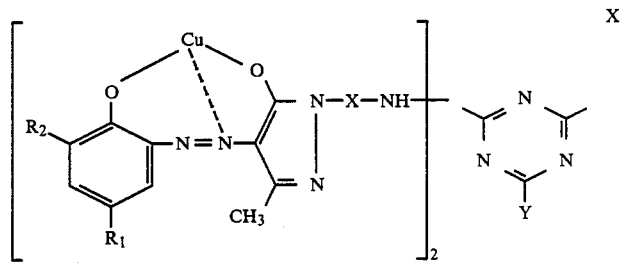

in which the symbols are as defined in Table 1.

EXAMPLES 61 TO 122 (TABLE 2)

By analogy with the method described in Examples 1 and 2, using appropriate starting compounds, further compounds of formula I can be prepared which are listed in Table 2. They correspond, in free acid form, to formula XI,

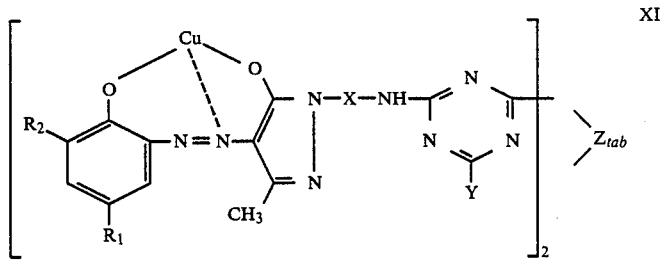

in which the symbols are as defined in Table 2.

EXAMPLES 123 TO 138 (TABLE 3)

By analogy with the method described in Example 1 further compounds of formula I can be prepared using the corresponding amount of acid dichloride instead of cyanuric chloride, while the process step concerning the condensation with a diamine is omitted. These dyes correspond to formula XII

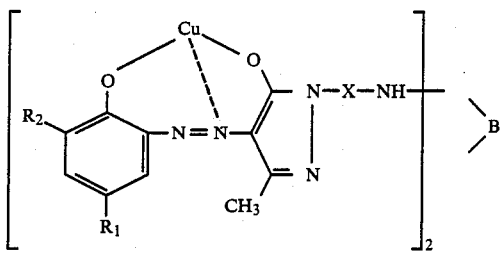

in which the symbols are as defined in Table 3.

EXAMPLES 139 TO 152 (TABLE 4)

By analogy with the method described in Examples 1 and 2, further compounds of formula I can be prepared which correspond, in free acid form, to formula XIII in which the symbols are as defined in Table 4. Since the chromophores in these dyes are not identical, pure asymmetric dyes with respect to the chromophores are obtained by reacting the different coppered monoazo compounds with cyanuric chloride (while a condensation reaction with diamine is omitted) in successive process steps. Otherwise, if the condensation reactions are carried out simultaneously or if a mixed coupling is effected, a mixture of symmetric and asymmetric dyes is obtained.

In the last column of each of Tables 1 to 4 the shade of the corresponding cotton dyeing is given under I, where a is brownish-yellow to yellow-brown, and b is brownish-orange.

The dyes of Examples 3 to 152 may be applied in analogous manner to Application Example I or II and aftertreated according to Application Example III; the thus obtained cotton dyeings have improved wash fastness properties.

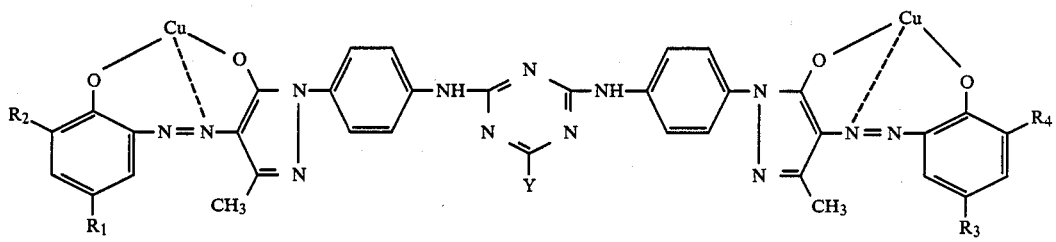

TABLE 1

(formula X)

| Ex. No. | $R_1$ | $R_2$ | —X— | Y | I |
|---|---|---|---|---|---|
| 3 | —$SO_2NH_2$ | H | 2-sulfo-stilbene-2'-sulfo bridge (—C$_6$H$_3$(SO$_3$H)—CH=CH—C$_6$H$_3$(SO$_3$H)—) | Cl | a |
| 4 | —$SO_2CH_3$ | H | " | Cl | a |
| 5 | $SO_3H$ | H | " | Cl | a |
| 6 | " | $NO_2$ | " | Cl | a |
| 7 | $CH_3$ | $SO_3H$ | " | Cl | a |
| 8 | $SO_3H$ | Cl | " | Cl | a |
| 9 | Cl | $SO_3H$ | " | Cl | b |
| 10 | $SO_3H$ | " | " | Cl | a |
| 11 | —$SO_2CH_2CH_2OSO_3H$ | H | " | Cl | a |
| 12 | " | H | " | —$NHC_2H_4OH$ | a |
| 13 | Cl | $SO_3H$ | " | " | b |
| 14 | Cl | " | " | —NH—C$_6$H$_5$ | b |
| 15 | Cl | " | " | —NH—C$_6$H$_4$—NHCOCH$_3$ | b |
| 16 | Cl | " | " | —$NH_2$ | b |
| 17 | Cl | " | " | —$N(C_2H_4OH)_2$ | b |
| 18 | Cl | " | " | —$NHCH_2SO_3H$ | b |
| 19 | Cl | " | " | —$NHCH_2CH_2SO_3H$ | b |
| 20 | Cl | " | " | —NH—C$_6$H$_4$—SO$_3$H | b |

TABLE 1-continued (formula X)

| Ex. No. | R₁ | R₂ | —X— | Y | I |
|---|---|---|---|---|---|
| 21 | SO₃H | —NHCOCH₃ | " | Cl | a |
| 22 | —NHCOCH₃ | SO₃H | " | Cl | a |
| 23 | SO₃H | H | " | —NH—C₆H₄(3-SO₂CH₂CH₂OSO₃H) | a |
| 24 | Cl | SO₃H | " | OH | b |
| 25 | SO₃H | H | —C₆H₄— (1,4) | Cl | a |
| 26 | " | SO₃H | " | Cl | a |
| 27 | " | " | " | —NHC₂H₄OH | a |
| 28 | —SO₂CH₂CH₂OSO₃H | H | " | Cl | a |
| 29 | " | H | " | —NHC₂H₄OH | a |
| 30 | SO₃H | SO₃H | " | —NH—C₆H₅ | a |
| 31 | " | " | " | —NH—C₆H₄(4-NHCOCH₃) | a |
| 32 | " | " | " | —NH—C₆H₄(3-NHCOCH₃) | a |
| 33 | " | " | " | —NH₂ | a |
| 34 | " | " | " | —NHCH₃ | a |
| 35 | —SO₂CH₂CH₂OSO₃H | " | " | —N(C₂H₄OH)₂ | a |
| 36 | " | " | " | —NHCH₂CH₂SO₃H | a |
| 37 | " | " | " | —NH—C₆H₄(3-SO₃H) | a |
| 38 | Cl | " | " | —NH—C₆H₄(4-SO₃H) | b |
| 39 | SO₃H | SO₃H | —C₆H₄— (1,4) | —NHCH₂SO₃H | a |
| 40 | " | H | " | —NHC₂H₄OH | a |
| 41 | " | H | " | —NH—C₆H₅ | a |
| 42 | " | H | " | —NH—C₆H₄(4-NHCOCH₃) | a |
| 43 | " | H | " | —N(C₂H₄OH)₂ | a |
| 44 | " | H | " | —NH—C₆H₄(3-SO₂CH₂CH₂OSO₃H) | a |
| 45 | " | Cl | " | " | a |
| 46 | " | H | " | —NH—C₆H₄(4-SO₂CH₂CH₂OSO₃H) | a |

TABLE 1-continued
(formula X)

| Ex. No. | R$_1$ | R$_2$ | —X— | Y | I |
|---|---|---|---|---|---|
| 47 | " | —NHCOCH$_3$ | " | —NHC$_2$H$_4$OH | a |
| 48 | " | SO$_3$H | " |  -N⟨morpholine⟩ | a |
| 49 | Cl | " | 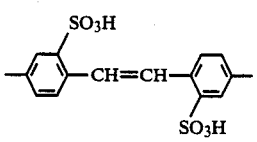 stilbene-2,2'-disulfonic acid | —NHCH$_3$ | b |
| 50 | Cl | " | " |  -N⟨morpholine⟩ | b |
| 51 | Cl | SO$_3$H | 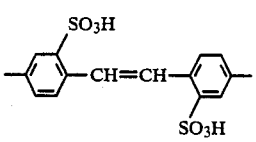 stilbene-2,2'-disulfonic acid | —NH(CH$_2$)$_3$OCH$_3$ | b |
| 52 | Cl | " | " |  -N⟨piperidine⟩ | b |
| 53 | SO$_3$H | " |  m-phenylene | Cl | a |
| 54 | " | " | " | —NHCH$_3$ | a |
| 55 | " | " | " | —NHC$_2$H$_4$OH | a |
| 56 | " | " | " | —NH(CH$_2$)$_3$OCH$_3$ | a |
| 57 | " | " | " | —N(CH$_3$)$_2$ | a |
| 58 | " | " | " | —N(C$_2$H$_4$OH)$_2$ | a |
| 59 | " | " | " | 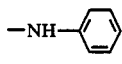 —NH—phenyl | a |
| 60 | " | " | " |  -N⟨morpholine⟩ | a |

TABLE 2
(formula XI)

| Ex. No. | R₁ | R₂ | —X— | Y | —Z_{sub}— | I |
|---|---|---|---|---|---|---|
| 61 | SO₃H | H | 4,4'-stilbene-2,2'-disulfonic acid diyl | Cl | 1,4-phenylenediamine diyl (—NH—C₆H₄—NH—) | a |
| 62 | —SO₂CH₂CH₂OSO₃H | Cl | " | Cl | " | a |
| 63 | " | H | " | Cl | piperazine-1,4-diyl | a |
| 64 | SO₃H | H | " | Cl | " | a |
| 65 | " | Cl | " | Cl | " | a |
| 66 | " | SO₃H | " | Cl | " | b |
| 67 | " | " | " | Cl | " | a |
| 68 | " | " | " | Cl | 1,4-phenylenediamine diyl | a |
| 69 | " | " | 2,5-dimethyl-phenylene | Cl | " | a |
| 70 | " | " | " | Cl | piperazine-1,4-diyl | a |
| 71 | " | " | 1,4-phenylene | Cl | " | a |

TABLE 2-continued
(formula XI)

| Ex. No. | $R_1$ | $R_2$ | —X— | Y | —$Z_{tab}$— | I |
|---|---|---|---|---|---|---|
| 72 | " | H | " | Cl | —NH—[phenyl(SO₃H)]—CH=CH—[phenyl(SO₃H)]—NH— | a |
| 73 | " | Cl | " | Cl | " | a |
| 74 | " | SO₃H | " | Cl | " | a |
| 75 | Cl | " | " | Cl | " | a |
| 76 | SO₃H | " | " | —NHC₂H₄OH | " | a |
| 77 | " | " | " | " | —N(piperazine)N— | a |
| 78 | " | " | " | —N(C₂H₄OH)₂ | —NH—[phenyl]—NH— | a |
| 79 | CH₃ | " | " | Cl | " | a |
| 80 | SO₃H | " | " | Cl | " | a |
| 81 | —SO₂CH₂CH₂OSO₃H | H | " | —NH—[phenyl] | " | a |
| 82 | " | H | " | Cl | —N(piperazine)N— | a |
| 83 | SO₃H | SO₃H | " | —NH—[phenyl] | " | a |

TABLE 2-continued (formula XI)

| Ex. No. | R$_1$ | R$_2$ | —X— | Y | —Z$_{1ab}$— | I |
|---|---|---|---|---|---|---|
| 84 | " | " | " | Cl | 4-NH-C$_6$H$_4$-C(O)NH-C$_6$H$_4$-4-NH— | a |
| 85 | " | " | " | Cl | —NHCH$_2$CH(OH)CH$_2$NH— | a |
| 86 | " | " | " | —NH$_2$ | " | a |
| 87 | " | " | " | —NH-C$_6$H$_5$ | " | a |
| 88 | " | " | " | Cl | —NHCH$_2$CH$_2$NH— | a |
| 89 | " | " | " | —NH$_2$ | " | a |
| 90 | " | " | " | —NHCH$_3$ | " | a |
| 91 | " | " | " | —NHC$_2$H$_4$OH | " | a |
| 92 | " | " | " | —NH(CH$_2$)$_3$OCH$_3$ | " | a |
| 93 | " | " | " | —NH(C$_2$H$_4$OH)$_2$ | " | a |
| 94 | " | " | " | morpholino | " | a |
| 95 | " | " | " | piperidino | " | a |
| 96 | Cl | " | 2,2'-disulfostilbene-4,4'-diyl | —NHCH$_3$ | piperazine-1,4-diyl | b |
| 97 | Cl | " | " | —NH(CH$_2$)$_3$OCH$_3$ | " | b |
| 98 | Cl | " | " | —(C$_2$H$_4$OH)$_2$ | " | b |

TABLE 2-continued
(formula XI)

| Ex. No. | R₁ | R₂ | —X— | Y | —Z_{tab}— | I |
|---|---|---|---|---|---|---|
| 99 | Cl | " | " | morpholino (N-linked) | 1,4-phenylene-di-NH— | b |
| 100 | SO₃H | " | 2,4-disubstituted phenyl (meta-xylylene type) | —NHCH₃ | " | a |
| 101 | " | " | " | —NHC₂H₄OH | " | a |
| 102 | " | " | " | —NH(CH₂)₃OCH₃ | " | a |
| 103 | " | " | " | —N(CH₃)₂ | " | a |
| 104 | " | " | " | —N(C₂H₄OH)₂ | " | a |
| 105 | " | " | " | | " | a |
| 106 | " | " | " | Cl | —NHCH₂CH₂NH— | a |
| 107 | " | " | " | —NHCH₃ | " | a |
| 108 | " | " | " | —NHC₂H₄OH | " | a |
| 109 | " | " | " | —NH(CH₂)₃OCH₃ | " | a |
| 110 | " | " | " | —N(CH₃)₂ | —NHCH₂CH₂NH— | a |
| 111 | " | " | " | —N(C₂H₄OH)₂ | " | a |
| 112 | " | " | " | morpholino | " | a |
| 113 | " | " | 1,4-phenylene | —NHCH₃ | 1,4-phenylene-di-NH— | a |
| 114 | " | " | " | —NH(CH₂)₃OCH₃ | " | a |
| 115 | " | " | " | Cl | 1,3-phenylene-di-NH— | a |
| 116 | " | " | " | —NHCH₃ | " | a |

TABLE 2-continued
(formula XI)
| Ex. No. | R₁ | R₂ | —X— | Y | —Z$_{ab}$— | I |
|---|---|---|---|---|---|---|
| 117 | " | " | " | —NHC₂H₄OH | " | a |
| 118 | " | " | " | —NH(CH₂)₃OCH₃ | " | a |
| 119 | " | " | " | —NH₂ | " | a |
| 120 | " | " | " | —N(C₂H₄OH)₂ | " | a |
| 121 | " | " | " | 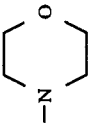 | " | a |
| 122 | " | " | " | 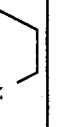 | " | a |

TABLE 3

(formula XII)

| Ex. No. | $R_1$ | $R_2$ | —X— | —B— | I |
|---|---|---|---|---|---|
| 123 | $SO_3H$ | H | ![2,2'-stilbenedisulfonic acid structure with SO₃H groups on both rings connected by CH=CH] | $-\overset{O}{\underset{\|\|}{C}}CH=CH\overset{O}{\underset{\|\|}{C}}-$ | a |
| 124 | " | Cl | " | " | a |
| 125 | Cl | $SO_3H$ | " | " | b |
| 126 | $SO_3H$ | H | " | $-\overset{O}{\underset{\|\|}{C}}\!\!-\!\!\langle\mathrm{C_6H_4}\rangle\!\!-\!\!\overset{O}{\underset{\|\|}{C}}-$ (para) | a |
| 127 | " | Cl | " | " | a |
| 128 | Cl | $SO_3H$ | " | " | b |
| 129 | $CH_3$ | " | " | " | a |
| 130 | $SO_3H$ | " | [para-phenylene] | " | a |
| 131 | " | " | " | $-\overset{O}{\underset{\|\|}{C}}CH=CH\overset{O}{\underset{\|\|}{C}}-$ | a |
| 132 | " | H | " | " | a |
| 133 | Cl | $SO_3H$ | " | " | b |
| 134 | $SO_3H$ | $-NHCOCH_3$ | " | " | a |
| 135 | " | $SO_3H$ | " | $-\overset{O}{\underset{\|\|}{C}}CH_2CH_2\overset{O}{\underset{\|\|}{C}}-$ | a |
| 136 | Cl | " | " | " | b |
| 137 | Cl | " | [meta-phenylene] | " | b |
| 138 | $SO_3H$ | " | " | " | a |

TABLE 4

(formula XIII)

| Ex. No. | $R_1$ | $R_2$ | $R_3$ | $R_4$ | Y | I |
|---|---|---|---|---|---|---|
| 139 | $SO_3H$ | $SO_3H$ | $SO_3H$ | H | Cl | a |
| 140 | " | " | " | H | $-NHC_2H_4OH$ | a |
| 141 | " | " | " | H | $-N(C_2H_4OH)_2$ | a |
| 142 | " | " | " | H | $-NH_2$ | a |
| 143 | " | " | " | H | $-NH-\langle C_6H_5\rangle$ | a |
| 144 | " | " | " | H | $-NHCH_3$ | a |
| 145 | $-SO_2NH_2$ | H | " | H | $-NH-\langle C_6H_4\rangle-SO_3H$ (meta) | a |
| 146 | $-SO_2CH_2CH_2OSO_3H$ | H | " | H | Cl | a |

TABLE 4-continued
(formula XIII)

| Ex. No. | R₁ | R₂ | R₃ | R₄ | Y | I |
|---|---|---|---|---|---|---|
| 147 | —SO₂NH₂ | H | " | H | Cl | a |
| 148 | Cl | SO₃H | " | SO₃H | Cl | b |
| 149 | SO₃H | Cl | " | " | Cl | a |
| 150 | " | Cl | " | " | 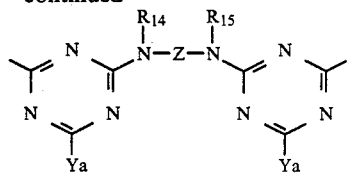 | a |
| 151 | " | Cl | " | " | 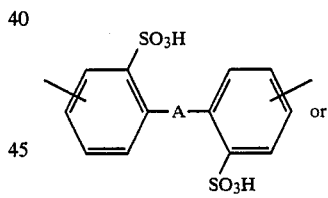 | a |
| 152 | " | SO₃H | " | H | " | a |

In accordance with the preparation method as described in Examples 1 and 2 the dyes according to Examples 1 to 152 are obtained in sodium salt form. They may, depending on the reaction and isolation conditions or by reacting the sodium salts in accordance with known methods, also be obtained in free acid form or in other salt forms, for example those salt forms containing one or more cations indicated in the description above. It is also possible to prepare mixed salt forms.

What is claimed is:

1. A complex of the formula

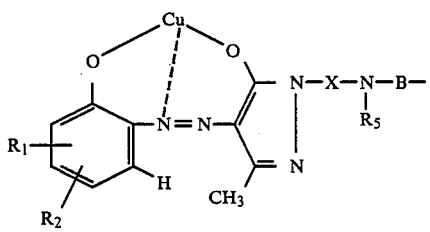

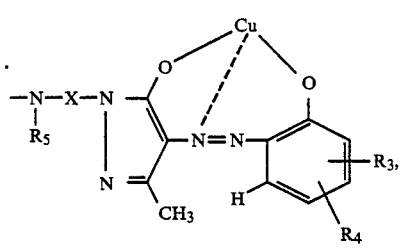

or a salt thereof each cation of which is independently a non-chromophoric cation,
wherein B is

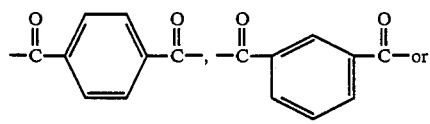

-continued

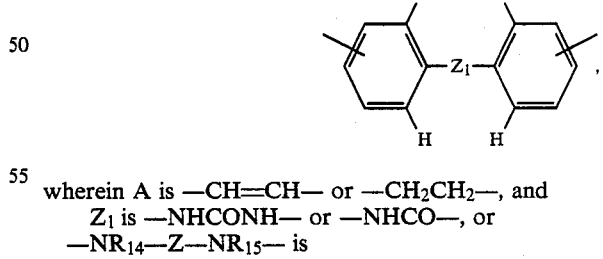

wherein each of $R_{14}$ and $R_{15}$ is independently hydrogen or $C_{1-4}$alkyl, and Z is linear or branched $C_{2-6}$alkylene; linear or branched $C_{3-6}$alkylene monosubstituted by hydroxy; $C_{5-6}$cycloalkylene; $C_{5-6}$cycloalkylene substituted by 1 to 3 $C_{1-4}$alkyl groups; phenylene; phenylene substituted by 1 or 2 substituents selected from halo, $C_{1-4}$alkyl, $C_{1-4}$alkoxy, sulfo and carboxy;

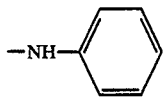

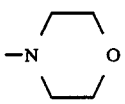

wherein A is —CH=CH— or —CH₂CH₂—, and
$Z_1$ is —NHCONH— or —NHCO—, or
—NR₁₄—Z—NR₁₅— is

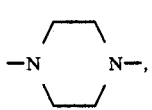

and
each Ya is independently chloro; hydroxy; methoxy; amino; $C_{1-4}$alkylamino; N,N—di($C_{1-4}$alkyl)amino; $C_{2-4}$hydroxyalkylamino; methoxy($C_{2-4}$alkyl- )amino; amino($C_{2-4}$alkyl)amino; sulfo($C_{1-4}$alkyl)amino; $C_{3-4}$dihydroxyalkylamino; N,N—di—($C_{2-4}$hydroxyalkyl)amino; phenylamino; phenylamino the phenyl group of which is substituted by 1 or 2 substituents selected from chloro, methyl, methoxy, acetamido, sulfo, carboxy and 2-sulfatoethylsulfonyl; piperidino or morpholino, each of $R_1$, $R_2$, $R_3$ and $R_4$ is independently hydrogen, halo, nitro, $C_{1-4}$alkyl, $C_{1-4}$alkoxy, —NHCO—$R_6$, —CO—$R_7$ or —$SO_2$—$R_8$, wherein $R_6$ is $C_{1-4}$alkyl or phenyl, $R_7$ is hydroxy; —$OR_9$; $C_{1-4}$alkyl; phenyl; phenyl substituted by 1 or 2 substituents selected from halo, nitro, $C_{1-4}$alkyl and $C_{1-4}$alkoxy; cyclohexyl; cyclohexyl substituted by 1 to 3 $C_{1-4}$alkyl groups; or —$NR_{10}R_{11}$, wherein $R_9$ is $C_{1-4}$alkyl; phenyl; phenyl substituted by 1 or 2 substituents selected from halo, nitro, $C_{1-4}$alkyl and $C_{1-4}$alkoxy; phenyl($C_{1-4}$alkyl) or phenyl($C_{1-4}$alkyl) the phenyl group of which is substituted by 1 or 2 substituents selected from halo, nitro, $C_{1-4}$alkyl and $C_{1-4}$alkoxy, $R_{10}$ is hydrogen, $C_{1-4}$alkyl; $C_{1-4}$alkyl substituted by 1 or 2 substituents selected from hydroxy, $C_{1-4}$alkoxy, halo and cyano; phenyl; phenyl substituted by 1 or 2 substituents selected from halo, nitro, $C_{1-4}$alkyl and $C_{1-4}$alkoxy; cyclohexyl or cyclohexyl substituted by 1 to 3 $C_{1-4}$alkyl groups, and $R_{11}$ is hydrogen; $C_{1-4}$alkyl; $C_{1-4}$alkyl substituted by 1 or 2 substituents selected from hydroxy, $C_{1-4}$alkoxy, halo and cyano; cyclohexyl or cyclohexyl substituted by 1 to 3 $C_{1-4}$alkyl groups, or —$NR_{10}R_{11}$ is morpholino, piperidino, piperazino or pyrrolidino, $R_8$ is hydroxy; $C_{1-4}$alkyl; $C_{1-4}$alkyl monosubstituted by halo or sulfato; $C_{2-4}$alkenyl; phenyl; phenyl substituted by 1 or 2 substituents selected from halo, nitro, $C_{1-4}$alkyl and $C_{1-4}$alkoxy; cyclohexyl; cyclohexyl substituted by 1 to 3 $C_{1-4}$alkyl groups; or —$NR_{10}R_{11}$, wherein $R_{10}$ and $R_{11}$ are as defined above, with the proviso that at least one of $R_1$, $R_2$, $R_3$ and $R_4$ is —$SO_2$—$R_8$, each $R_5$ is independently hydrogen, $C_{1-4}$alkyl or $C_{1-4}$alkyl monosubstituted by hydroxy, halo or cyano, and each X is independently

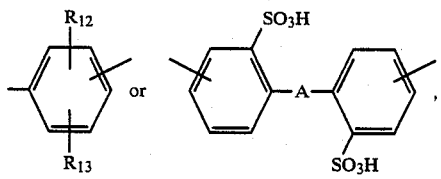

wherein A is —CH=CH— or —$CH_2CH_2$—,
$R_{12}$ is hydrogen or sulfo, and
$R_{13}$ is hydrogen, halo, $C_{1-4}$alkyl or $C_{1-4}$alkoxy,
or a mixture of such complexes each of which is in free acid form or salt form each cation of which is independently a non-chromophoric cation.

2. A complex according to claim 1, or a salt thereof each cation of which is independently a non-chromophoric cation.

3. A complex according to claim 2, or a salt thereof each cation of which is independently a non-chromophoric cation, wherein each B and X is free of sulfo groups, at least one of $R_1$ and $R_2$ is —$SO_2$—$R_8$, at least one of $R_3$ and $R_4$ is —$SO_2R_8$, and each $R_8$ is hydroxy.

4. A complex according to claim 2, or a salt thereof each cation of which is independently a non-chromophoric cation, wherein B is

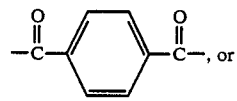

or

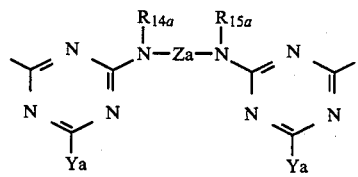

wherein each of $R_{14a}$ and $R_{15a}$ is independently hydrogen, methyl or ethyl, and $Z_a$ is linear or branched $C_{2-3}$alkylene; linear or branched $C_{3-4}$alkylene monosubstituted by hydroxy; 1,4-cyclohexylene; 1,3-phenylene; 1,4-phenylene; 1,3- or 1,4-phenylene monosubstituted by chloro, methyl, methoxy, sulfo or carboxy;

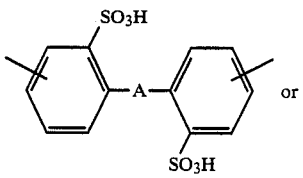

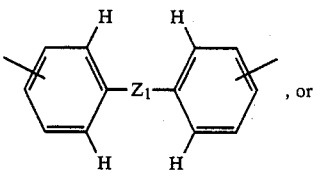

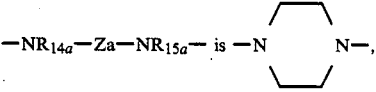

each of $R_1$, $R_2$, $R_3$ and $R_4$ is independently hydrogen, chloro, nitro, methyl, methoxy, —NHCO—$R_{6b}$, —CO—$R_{7b}$ or —$SO_2$—$R_{8c}$, wherein $R_{6b}$ is methyl or phenyl, $R_{7b}$ is hydroxy, —$OR_{9b}$, methyl, ethyl, phenyl or —NH—$R_{10c}$, wherein $R_{9b}$ is methyl, ethyl, phenyl or benzyl, and
$R_{10c}$ is hydrogen, methyl, ethyl, $C_{2-3}$hydroxyalkyl or cyclohexyl, $R_{8c}$ is hydroxy, methyl, ethyl, phenyl or —$NR_{10b}R_{11b}$, wherein $R_{10b}$ is hydrogen, methyl, ethyl, $C_{2-3}$hydroxyalkyl, phenyl, chlorophenyl, methylphenyl or cyclohexyl, and $R_{11b}$ is hydrogen, methyl, ethyl, $C_{2-3}$hydroxyalkyl or cyclohexyl, or
—$NR_{10b}R_{11b}$ is piperazino,
each $R_5$ is hydrogen, and
each X is independently 1,3-phenylene, 1,4-phenylene or

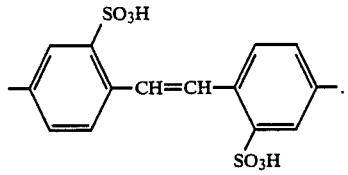

5. A complex according to claim 2 having the formula

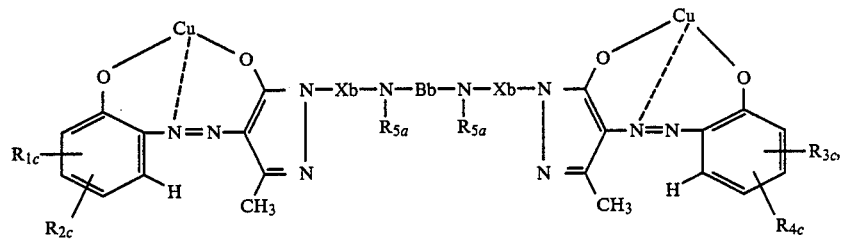

or a salt thereof each cation of which is independently a non-chromophoric cation,
wherein Bb is

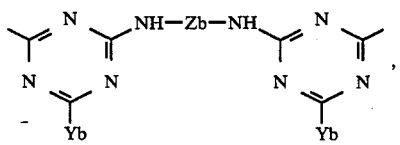

wherein each Yb is independently chloro, amino, $C_{1-2}$alkylamino, $C_{2-3}$hydroxyalkylamino, methoxy($C_{2-3}$alkyl)amino, N,N-di-($C_{2-3}$hydroxyalkyl)amino, phenylamino, acetamidophenylamino, sulfophenylamino, piperidino or morpholino, and
Zb is 1,3-phenylene, 1,4-phenylene

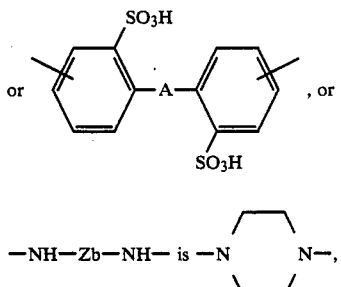

—NH—Zb—NH— is —N͡   N—, each of $R_{1c}$ and $R_{3c}$ is independently —$SO_2$—$R_{8d}$,
wherein $R_{8d}$ is hydroxy, methyl or —$NHR_{10c}$,
wherein $R_{10c}$ is hydrogen, methyl, ethyl, $C_{2-3}$hydroxyalkyl or cyclohexyl,
each of $R_{2c}$ and $R_{4c}$ is independently hydrogen, chloro, nitro, methyl, sulfo, acetamido or —CO—$R_{7c}$,
wherein $R_{7c}$ is hydroxy, —$OR_{9c}$ or amino, wherein $R_{9c}$ is methyl or ethyl, each $R_{5a}$ is independently hydrogen, methyl, ethyl or $C_{2-3}$hydroxyalkyl, and each Xb is independently 1,3-phenylene, 1,4-phenylene or

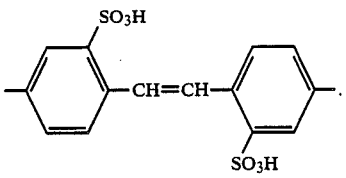

6. A complex according to claim 5, or a salt thereof each cation of which is independently a non-chromophoric cation,

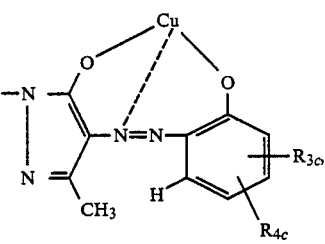

wherein Bb is

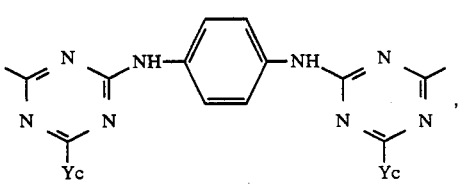

wherein each Yc is independently chloro, 2-hydroxyethylamino, N,N-di-(2-hydroxyethyl)amino, 3-methoxypropylamino, phenylamino or morpholino.

7. A complex according to claim 6, or a salt thereof each cation of which is independently a non-chromophoric cation,
wherein each Xb is 1,4-phenylene.

8. A complex according to claim 7, or a salt thereof each cation of which is independently a non-chromophoric cation, wherein Bb is

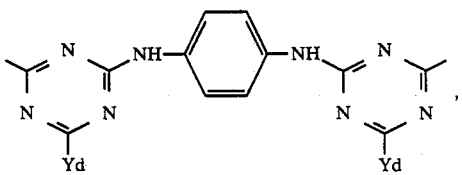

wherein each Yd is chloro, 2-hydroxyethylamino, N,N-di-(2-hydroxyethyl)amino, 3-methoxypropylamino or morpholino, the two Yd's being the same.

9. A complex according to claim 5, or a salt thereof each cation of which is independently a non-chromophoric cation,
wherein each $R_{5a}$ is hydrogen.

10. A complex according to claim 2, or a salt thereof each cation of which is independently a non-chromophoric cation, wherein B is

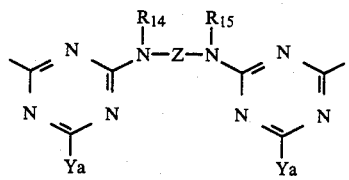

11. A complex according to claim 10, or a salt thereof each cation of which is independently a non-chromophoric cation,
wherein each Ya is independently hydroxy; methoxy; amino; $C_{1-4}$alkylamino; N,N—di—($C_{1-4}$alkyl)amino; $C_{2-4}$hydroxyalkylamino; methoxy($C_{2-4}$alkyl)amino; amino($C_{2-4}$alkyl)amino; sulfo($C_{1-4}$alkyl)amino; $C_{3-4}$dihydroxyalkylamino; N,N—di—($C_{2-4}$hydroxyalkyl)amino; phenylamino; phenylamino the phenyl group of which is substituted by 1 or 2 substituents selected from chloro, methyl, methoxy, acetamido, sulfo, carboxy and 2-sulfatoethylsulfonyl; piperidino or morpholino.

12. A complex according to claim 10, or a salt thereof each cation of which is independently a non-chromophoric cation,
wherein B is

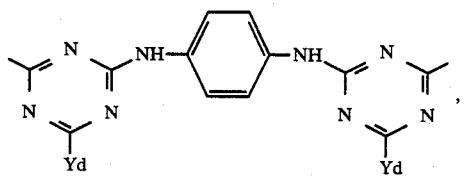

wherein each Yd is chloro, 2-hydroxyethylamino, N,N—di—(2-hydroxyethyl)amino, 3-methoxypropylamino or morpholino, the two Yd's being the same.

13. A complex according to claim 12, or a salt thereof each cation of which is independently a non-chromophoric cation, wherein each Yd is 2-hydroxyethylamino, N,N—di—(2-hydroxyethyl)amino, 3-methoxypropylamino or morpholino, the two Yd's being the same.

14. A complex according to claim 2, or a salt thereof each cation of which is independently a non-chromophoric cation,
wherein each Ya is independently hydroxy; methoxy; amino; $C_{1-4}$alkylamino; N,N—di—($C_{1-4}$alkyl)amino; $C_{2-4}$hydroxyalkylamino; methoxy($C_{2-4}$alkyl)amino; amino($C_{2-4}$alkyl)amino; sulfo($C_{1-4}$alkyl)amino; $C_{3-4}$dihydroxyalkylamino; N,N—di—($C_{2-4}$hydroxyalkyl)amino; phenylamino; phenylamino the phenyl group of which is substituted by 1 or 2 substituents selected from chloro, methyl, methoxy, acetamido, sulfo, carboxy and 2-sulfatoethylsulfonyl; piperidino or morpholino.

15. A complex according to claim 5, or a salt thereof each cation of which is independently a non-chromophoric cation,
wherein each Yb is independently amino, $C_{1-2}$alkylamino, $C_{2-3}$hydroxyalkylamino, methoxy($C_{2-3}$alkyl)amino, N,N—di—($C_{2-3}$hydroxyalkyl)amino, phenylamino, acetamidophenylamino, sulfophenylamino, piperidino or morpholino.

16. A complex according to claim 6, or a salt thereof each cation of which is independently a non-chromophoric cation,
wherein each Yc is independently 2-hydroxyethylamino, N,N—di—(2-hydroxyethyl)amino, 3-methoxypropylamino, phenylamino or morpholino.

17. A complex according to claim 8, or a salt thereof each cation of which is independently a non-chromophoric cation,
wherein each Yd is 2-hydroxyethylamino, N,N—di—(2-hydroxyethyl)amino, 3-methoxypropylamino or morpholino, the two Yd's being the same.

18. The complex according to claim 9 having the formula

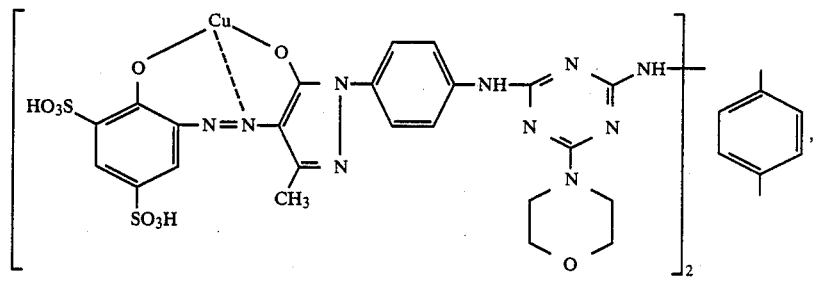

or a salt thereof each cation of which is independently a non-chrompohoric cation.

19. The complex according to claim 9 having the formula

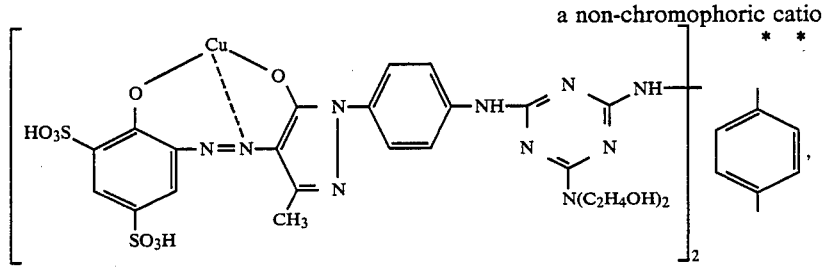
or a salt thereof each cation of which is independently a non-chromophoric cation.
* * * * *